(12) United States Patent
Ide et al.

(10) Patent No.: US 6,475,613 B1
(45) Date of Patent: Nov. 5, 2002

(54) MAGNETIC RECORDING MEDIUM

(75) Inventors: Tsutomu Ide, Nagano (JP); Akira Saitoh, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/556,313

(22) Filed: Apr. 24, 2000

(30) Foreign Application Priority Data

Apr. 28, 1999 (JP) .......................................... 11-122540

(51) Int. Cl.$^7$ ................................................ G11B 5/735
(52) U.S. Cl. ...................... 428/323; 428/328; 428/330; 428/694 BB; 428/900
(58) Field of Search ................................. 428/323, 328, 428/330, 694 BB, 900

(56) References Cited

U.S. PATENT DOCUMENTS

| | | |
|---|---|---|
| 4,600,638 A | 7/1986 | Ishikuro et al. |
| 5,134,027 A | 7/1992 | Yanagita et al. |
| 5,795,642 A | 8/1998 | Ishikawa et al. |

FOREIGN PATENT DOCUMENTS

| | | |
|---|---|---|
| EP | 0 849 725 A1 | 6/1998 |
| JP | 03141021 | 6/1991 |
| JP | 09115134 | 5/1997 |

OTHER PUBLICATIONS

Abstract of Japanese Patent Publ. No. 0314021; dated Jun. 17, 1991.
Abstract of Japanese Patent Publ. No. 09115134; dated May 2, 1997.

*Primary Examiner*—Stevan A. Resan
(74) *Attorney, Agent, or Firm*—Rader, Fishman & Grauer PLLC

(57) ABSTRACT

The invention provides a magnetic recording medium which is reduced in the occurrence of a dropout and has excellent durability.

The magnetic recording medium comprises a magnetic layer on one surface of a non-magnetic support and a back-coat layer, containing mainly a non-magnetic powder and a binder, on the other surface. The back-coat layer includes (a) a carbon black having an average particle size of 15 to 25 nm, (b) a carbon black having an average particle size of 60 to 80 nm and (c) $CaCO_3$ and/or $BaSO_4$ having an average particle size of 30 to 75 nm as the non-magnetic powder. The back-coat layer preferably includes said carbon black (a), said carbon black (b) and said $CaCO_3$ and/or $BaSO_4$ (c) in a ratio of (a)/(b)/(c)=60–80/3–15/15–30 by weight.

1 Claim, No Drawings

MAGNETIC RECORDING MEDIUM

BACKGROUND OF THE INVENTION

1. Field of the Invention

The present invention relates to a magnetic recording medium having a back-coat layer and, particularly, to a magnetic recording medium which is reduced in the occurrence of a dropout and has excellent durability.

2. Disclosure of the Related Art

In many magnetic recording media having a magnetic layer on one surface of a non-magnetic support, a back-coat layer is formed on the surface opposite to the magnetic layer of the support for the purpose of improving running stability and preventing the electrification of the magnetic layer.

As shown in Japanese Laid-open Patent Application Nos. 3-141021 (1991) and 9-115134 (1997), it is known that as carbon black, one having a large particle size and one having a small particle size are used in combination with calcium carbonate for a back-coat layer. It is insisted that such a structure resulted in the production of a magnetic recording medium which has low friction, is reduced in the falling of carbon black from the back-coat layer and has high reliability.

However, if carbon black having an average particle size of as large as 230 to 300 nm is used for the back-coat layer as described in Japanese Laid-open Patent Application No. 9-115134, there is a tendency that a dropout occurs and the error rate is adversely affected due to damages and concaves of a magnetic surface which are caused by the transfer of the carbon black to the magnetic surface since carbon black having large particle size has poor dispersibility. Poor dispersibility of carbon black also causes carbon black having large particle size to be fallen away from the back-coat layer with ease and hence there is a tendency that the durable friction characteristics is deteriorated and damages to the magnetic layer and adhesion of the carbon black to a head are caused.

In Japanese Laid-open Patent Application No. 3-141021, it is disclosed concretely in the examples that carbon black having an average particle size of as small as 27 nm, carbon black having an average particle size of as large as 72 nm and calcium carbonate with a Mohs hardness of 3 to 4 are used for the back-coat layer.

However, when, as the carbon black having small particle size, one having a particle size exceeding 25 nm is used, the resulting recording medium increases in dropout after it is stored in a high temperature and high humidity condition under such a severe evaluation criterion as 2 $\mu$sec-12 dB as shown in the examples of the present specification.

In the above JP-A-3-141021, also the proportion of carbon black having large particle size is as large as 17 to 40% by weight based on the total amount of the aforementioned two types of carbon black and inorganic powder. This increases the irregularities of the surface of the back-coat and deteriorates, a dropout and the durable friction characteristics. A dropout increases particularly after storage in a high temperature and high humidity condition.

Moreover, in the above JP-A-3-141021, $CaCO_3$ and $BaSO_4$ having Mohs hardness of 3 to 6 are described as an inorganic powder. However, the particle size of the inorganic powder is nowhere described and the use of these compounds often increases a dropout and deteriorates the durable friction characteristics.

SUMMARY OF THE INVENTION

In view of the above situation, it is an object of the present invention to solve the above problem and to provide a magnetic recording medium which is reduced in the occurrence of a dropout and has excellent durability.

The present inventors have made earnest studies and, as a result, found that the above problem is solved by using three types of non-magnetic powder each having a specific particle size as essential components for a back-coat layer to attain a magnetic recording medium according to the present invention.

Namely, the present invention relates to a magnetic recording medium comprising a magnetic layer on one surface of a non-magnetic support and a back-coat layer containing mainly a non-magnetic powder and a binder on the other surface, wherein the back-coat layer includes (a) a carbon black having an average particle size of 15 to 25 nm, (b) a carbon black having an average particle size of 60 to 80 nm and (c) $CaCO_3$ and/or $BaSO_4$ having an average particle size of 30 to 75 nm as the non-magnetic powder.

In the present invention, it is preferable that said carbon black (a) having an average particle size of 15 to 25 nm has an oil absorption ranging from 50 to 110 cc/100 g and a specific surface area (BET value) ranging from 100 to 300 $m^2/g$ measured by the BET method.

In the present invention, it is preferable that said carbon black (b) having an average particle size of 60 to 80 nm has an oil absorption ranging from 20 to 80 cc/100 g and a specific surface area (BET value) ranging from 10 to 50 $m^2/g$ measured by the BET method.

In the present invention, the back-coat layer preferably includes said carbon black (a), said carbon black (b) and said $CaCO_3$ and/or $BaSO_4$ (c) in a ratio of (a)/(b)/(c)=60–80/3–15/15–30 by weight.

According to the present invention, a magnetic recording medium which is reduced in the occurrence of a dropout and has excellent durability is provided. The present invention can be used in various applications like magnetic tapes such as video tapes and audio tapes and magnetic disks.

DETAILED DESCRIPTION OF THE INVENTION

The magnetic recording medium of the present invention is provided with a magnetic layer on one surface of a non-magnetic support and a back-coat layer containing mainly of a non-magnetic powder and a binder on the other surface. In the magnetic recording medium of the present invention, a lubricant coating layer or various coating layers protecting the magnetic layer may be formed as required on the magnetic layer. Also, on the surface of the non-magnetic support, on which the magnetic layer is to be formed, an undercoat layer (adhesion facilitating layer) can be formed to improve the adhesion between the coating film and the non-magnetic support. Further, when a magnetic layer having a thickness of 0.5 $\mu$m or lower is formed, there are many cases where absolute film strength and the quantity of a lubricant are unsatisfied. Therefore, a non-magnetic underlayer having a thickness of 0.5 $\mu$m or more and preferably 0.8 to 1.5 $\mu$m may be formed between the magnetic layer and the non-magnetic support.

In the present invention, at least two kinds of carbon black which differ in particle size are used as the essential components of the back-coat layer.

The first carbon black (a) is used to form a basic surface of the back-coat layer and is a primary pigment component for forming the back-coat layer. The average particle size of the first carbon black (a) is 15 to 25 nm, preferably 15 to 20 nm and more preferably 15 nm or larger and less than 20 nm.

When the average particle size of the carbon black (a) is less than the lower limit of the above range, the dispersibility is impaired and hence the irregularities of the surface of the back-coat later increase, resulting in a dropout increase after storage in a high temperature and high humidity condition. On the other hand, when the average particle size of the carbon black (a) exceeds the upper limit of the above range, the increase in irregularities of the surface of the back-coat layer is caused by the deterioration of the dispersibility and the influence of the average particle size, resulting in, particularly increased dropouts after storage in a high temperature and high humidity condition. Also, since the irregularities of the layer surface are increased, the effect of the second carbon black (b) on the friction is lost.

Preferably the aforementioned carbon black (a) has an oil absorption ranging from 50 to 110 cc/100 g and a BET value ranging from 100 to 300 $m^2/g$. When the oil absorption and/or BET value of the carbon black (a) exceed each upper limit of the above ranges, the dispersibility decreases and as a consequence, it is feared that the layer surface becomes rough. Also, powder falls from the back-coat layer and adhesion to a head is easily caused. When the oil absorption and/or BET value of the carbon black (a) are less than each lower limits of the above ranges, the chain structure among carbon black particles is formed with difficulty and hence it is feared that electric resistance is increased. A more preferable range of the oil absorption of the above carbon black (a) is 55 to 80 cc/100 g and a more preferable range of the BET value of the carbon black (a) is 150 to 250 $m^2/g$.

The second carbon black (b) is used to form a first micro-convex portion, which serves to reduce friction, on the basic surface of the back-coat layer which is formed using the first carbon black (a). The second carbon black (b) has an average particle size of 60 to 90 nm. When the average particle size of the carbon black (b) exceeds the upper limit of the above range, the irregularities of the surface of the back-coat layer increase and hence there is a possibility that the same nonconformity as in conventional media occurs. A dropout after storage in a high temperature and high humidity condition increases in particular. On the other hand, when the average particle size of the carbon black (b) is less than the lower limit of the above range, a difference of the second carbon black (b) from the first carbon black (a) becomes indistinct and as a result, it is feared that the irregularities of the surface of the back-coat layer decrease, which impairs the durable friction characteristics of the back-coat layer.

Preferably the aforementioned carbon black (b) has an oil absorption ranging from 20 to 80 cc/100 g and a BET value ranging from 10 to 50 $m^2/g$. When the oil absorption and/or BET value of the carbon black (b) exceed each upper limit of the above ranges, the dispersibility is lowered and hence the convex portion of the layer surface is increased. Therefore, a dropout after storage in a high temperature and high humidity condition tends to increase. When the oil absorption and/or BET value of the carbon black (b) are less than each lower limits of above ranges, the dispersibility is lowered and hence the convex portion of the layer surface is increased. Therefore, a dropout after storage in a high temperature and high humidity condition tends to increase and the durability of the back-coat layer is impaired, whereby it is feared that adhesion to a head is increased. A more preferable range of the oil absorption of the above carbon black (b) is 40 to 70 cc/100 g and a more preferable range of the BET value of the carbon black (b) is 15 to 40 $m^2/g$.

Carbon black which can be used as the carbon black (a) or the carbon black (b) may refer to "Carbon Black Almanac" (edited by the Society of Carbon Black) or the like.

Specific examples of the carbon black (a) may include Carbon Black #1000 (average particle size: 18 nm), #990 (16 nm), #980 (16 nm), #970 (16 nm), #960 (16 nm), #950 (16 nm), #900 (16 nm), #850 (18 nm), MCF88 (18 nm), #47(23 nm), #45 (24 nm), #45L (24 nm), #44 (24 nm) and #40 (24 nm) which are manufactured by Mitsubishi Chemical and BLACK PEARLS 880 (16 nm) and BLACK PEARLS 800 (17 nm) manufactured by SHOWA CABOT K.K.

Specific examples of the carbon black (b) may include BLACK PEARLS 130 (average particle size: 75 nm) manufactured by SHOWA CABOT K.K. and Raven 460 (67 nm) and Raven 450 (75 nm) manufactured by Columbian Chemicals Company.

In the present invention, moreover, calcium carbonate ($CaCO_3$) and/or barium sulfate ($BaSO_4$) (c) having an average particle size of 30 to 75 nm are used as the essential component of the back-coat layer. Calcium carbonate and/or barium sulfate are used to form a second micro-convex portion improving durability on the basic surface of the back-coat layer which is formed by the first carbon black (a) in addition to the first micro-convex portion reducing friction.

When the average particle size of calcium carbonate and/or barium sulfate exceeds the upper limit of the above range, a difference between the first micro-convex portion and the second micro-convex portion becomes small or the second micro-convex portion becomes larger than the first micro-convex portion. So, it is feared that the friction characteristics are impaired and adhesion to a head is increased. In light of this, the average particle size of calcium carbonate and/or barium sulfate (c) is preferably smaller than that of the carbon black (b) in the same back-coat layer. When the average particle size of the compound (c) exceeds the upper limit of the above range, if the case of using the compound (c) in the same weight is supposed, the absolute number of calcium carbonate and/or barium sulfate decreases, in the coating film. This reduces the effect of calcium carbonate and/or barium sulfate as a reinforcing agent and impairs the durability of the medium.

On the other hand, when the average particle size of calcium carbonate and/or barium sulfate is less than the lower limit of the above range, the second micro-convex portion is made excessively small for the basic surface formed by the first carbon black (a), or since the second micro-convex portion is embedded in the basic surface of the first carbon black (a), the effect of calcium carbonate and/or barium sulfate as a reinforcing agent is decreased, causing a breakdown of the surface of the back-coat which arouses a fear that adhesion to a head is increased and the durability of the medium is impaired.

Because such calcium carbonate and/or barium sulfate like this are relatively soft pigment particles having a Mohs hardness as low as 3 to 4, they decrease occurrence of such a problem as to abrade the parts of a traveling system and to scrape the magnetic layer carelessly as compared with the case of using pigment particles having a Mohs hardness of 5 or more together. Calcium carbonate and/or barium sulfate also have such an effect that they impart higher dispersibility than the case of using only carbon black particles as the non-magnetic powder. Also, they enable to impart a certain degree of hardness to the back-coat layer, giving an effect of preventing the back-coat layer itself from being abraded.

Each average particle size of the carbon blacks (a) and (b) and calcium carbonate and/or barium sulfate (c) is a value measured using a transmitting type electron microscope.

In the present invention, said carbon black (a), said carbon black (b) and said $CaCO_3$ and/or $BaSO_4$ (c) are preferably included in a ratio of (a)/(b)/(c)=60–80/3–15/15–30 by weight in the back-coat layer.

Since the first carbon black (a) is a major pigment component for forming the back-coat layer, the second carbon black (b) is preferably used in the above range by weight which is smaller than that of the first carbon black (a). When the ratio by weight of the carbon black (b) to the carbon black (a) exceeds the upper limit of the above range, the irregularities, particularly the convex portions of the surface of the back-coat layer become large, whereby a dropout, particularly after storage in a high temperature and high humidity condition tends to increase. On the other hand, when the ratio by weight of the carbon black (b) to the carbon black (a) is less than the lower limit of the above range, the irregularities of the surface of the back-coat layer become small, whereby the friction characteristics tend to be impaired.

The ratio by weight of the aforementioned $CaCO_3$ and/or $BaSO_4$ (c) exceeds the upper limit of the above range, there is a tendency that the running characteristics of a tape becomes unstable and adhesion to a head is caused because of increased surface electric resistance of the back-coat layer. On the other hand, when the ratio by weight of the aforementioned $CaCO_3$ and/or $BaSO_4$ (c) is less than the lower limit of the above range, the effect of reinforcing the coating film is not obtained, causing, for instance, abrasion of the back-coat layer and therefore there is a tendency that the durability of the medium is impaired and adhesion to a head is increased.

In the back-coat layer, a more preferable ratio by weight of the aforementioned carbon black (a), the aforementioned carbon black (b) and the aforementioned $CaCO_3$ and/or $BaSO_4$ (c), namely (a)/(b)/(c) is 70–78/3–8/15–25.

As a binder used to disperse such non-magnetic powder, a resin which can be used to form a back-coat layer for magnetic tape may be used. Examples of such a resin include nitrocellulose, vinyl chloride type copolymers, butyral resins, phenoxy resins, epoxy resins, polyurethane resins, polyester resins and rubber type resins such as butadiene rubber. Among these resins, a combination of nitrocellulose and a polyurethane resin and/or a polyester resin or a combination of a vinyl chloride type copolymer and a polyurethane resin and/or a polyester resin is preferred. In particular, it is preferable that the proportion of a resin such as nitrocellulose or a vinyl chloride type copolymer be 50% or more by weight.

The content of the binder is preferably 15 to 200 parts by weight and more preferably 50 to 180 parts by weight based on 100 parts by weight of the total solid. When the content of the binder is excessively high, friction with a passage with which the media is in sliding contact becomes too large and hence the running stability is lowered whereby the running accident tends to take place. This also arises problems such as blocking with the magnetic layer. When the content of the binder is too small, the strength of the back-coat layer is reduced and running durability tends to decrease.

Besides the aforementioned components, a dispersant such as a surfactant, lubricant such as a higher fatty acid, a fatty acid ester and a silicon oil, and other additives may be added as required in the back-coat layer.

In the present invention, the back-coat layer may be formed by dispersing the aforementioned components in an appropriate solvent by a generally well-known dispersing method to prepare a back-coat coating material and applying the coating material onto a non-magnetic support by a well-known method, followed by drying. Here, in order to make full use of the effect of the present invention, it is desirable to carry out calendering and to perform surface polishing and cleaning. The formation of the back-coat layer will be hereinafter mentioned in detail.

(Solvent)

No particular limitation is imposed on a solvent used in the present invention and the solvent is fairly selected in consideration of, for example, the solubility, compatibility and drying efficiency of the binder. For example, ketones such as methyl ethyl ketone, methyl isobutyl ketone and cyclohexanone, aromatic hydrocarbons such as toluene and xylene, esters such as ethyl acetate and butyl acetate, alcohols such as isopropanol and butanol and diluents or solvents such as dioxane, tetrahydrofuran, dimethylformamide, hexane and chlorine-substituted hydrocarbons are used either as a single solvent or as a mixture solvent prepared by mixing these solvents in an optional ratio.

(Coating Material Step)

A process for producing a back-coat coating material involves a kneading step, dispersing step and mixing steps provided as required before and after these steps according to well-known methods. In the kneading step, any machine having strongly kneading power such as a continuous kneader, pressure kneader, high speed mixer and twin roll mill may be used.

In the dispersing step, a ball mill, sand grinder, pin-type mill, ultra fine mill, attritor and basket mill may be used as a media-stirring type mill. As a dispersing media, one having high specific gravity is preferably used and ceramic type media such as zirconia is preferred, provided that conventionally used glass beads, metal beads or alumina beads may be selected and used.

(Applying, Drying, Calendering and Slitting Step)

A coating material is applied onto the non-magnetic support by a well-known application means such as gravure coating, reverse roll coating or extrusion nozzle coating.

The coating material thus applied is generally dried and fixed by a well-known drying and evaporating means, e.g., hot air, far infrared rays or electric heaters, provided in a drying furnace etc. The drying temperature is preferably in a range from room temperature to 300° C. and preferably up to about 150° C.

After the drying is performed in this manner, a calendering process is carried out as required to smooth the surface. As the calendering roll, a combination of a roll made of a heat resistant plastic (which may be that prepared by kneading together with carbon, metals or other inorganic compounds) such as an epoxy, polyester, nylon, polyimide, polyamide or polyimideamide and a metal roll, or a combination of metal rolls may be used. The treating temperature is preferably 70° C. or more and more preferably 80° C. or more. The linear pressure is preferably 1900 N/cm or more and more preferably 2900 N/cm or more. The velocity is in a range between 20 m/minute and 700 m/minute.

After the calendering, heat curing treatment at 40° C. to 80° C. and/or electron beam irradiation treatment may be performed to promote the curing of the magnetic layer, back-coat layer and non-magnetic under-layer (if it is formed). Next, polishing treatment is performed as required, followed by carrying out slitting to obtain a magnetic recording medium.

The back-coat layer may be formed either before or after the application and formation of the magnetic layer.

The thickness (after the calendaring) of the back-coat layer is 1.0 μm or less, preferably 0.1 to 1.0 μm and more preferably 0.2 to 0.8 μm. When the back-coat layer is excessively thick, friction with a passage with which the media is in sliding contact becomes too large and hence the running stability tends to decrease. When the back-coat layer is excessively thin on the contrary, there is a tendency that the surface of the back-coat layer becomes rough by the influence of the surface roughness of the non-magnetic support and abrasion of the back-coat layer tends to be caused during the running of the medium.

The magnetic layer can be formed by preparing a magnetic coating material by using the magnetic powder and binder mentioned below and applying the coating material onto the non-magnetic support. Solvents, a coating material-forming step and applying, drying and calendering process which are used in the preparation of the magnetic coating material are the same as those used in the aforementioned back-coat layer.

(Magnetic Powder)

As magnetic powder for the magnetic layer, besides well-known ferromagnetic alloy powders containing ferromagnetic metal elements such as α-Fe, Fe—Co, Fe—Ni, Fe—Co—Ni, Co or Co—Ni as the major component, magnetic powders of iron oxide such as $\gamma\text{-Fe}_2\text{O}_3$ may be used. The effect of the present invention is produced by ferromagnetic alloy powders containing Fe and/or Co as the major component and also that containing a rare earth metal including Y among these magnetic powders. Specifically, these magnetic powders of ferromagnetic alloy are most suitable for high density recording in backup data tapes represented by a recent DDS and DLT. Since the surface of each magnetic layer of these tapes is extremely smoothed, if the surface of the magnetic layer is brought into contact with the back-coat in a rolled condition and the irregularities of the surface of the back-coat are transferred to the surface of the magnetic layer, a dropout is increased with the result that the reliability as the data tape is lost. However, because the back-coat of the present invention contains no carbon black having large particle size, the problem concerning this transfer is improved remarkably.

Such a ferromagnetic alloy powder is usually contained in an amount of 100 to 2000% by weight based on 100% by weight of the binder. The content of the ferromagnetic alloy powder in the magnetic layer is 50 to 95% by weight and preferably 55 to 90% by weight in the total magnetic layer. An excessively high content of the ferromagnetic alloy powder easily causes the drawbacks such as a reduction in the durability of the magnetic layer because each amount of additives including a resin in the magnetic layer becomes relatively small. When the content of the ferromagnetic alloy powder is excessively small, high reproducing output is not obtained.

Preferably these ferromagnetic alloy powders have a needle- or spindle-shaped form. A needle- or spindle-shaped ferromagnetic alloy powder having an axial ratio (major axis/minor axis) of about 3 to 10 is effective in general. The average major axis length of the ferromagnetic alloy powder is preferably 0.05 to 0.3 μm and more preferably 0.08 to 0.2 μm. When the average major axis length is too large, the bulk noise of a tape is increased whereas when the average major axis length is too small, the aggregation of ferromagnetic alloy powders among them is easily caused in a magnetic coating material.

(Binder)

As the binder for magnetic layer, a thermoplastic resin, thermosetting or reactive resin or electron beam-functional type modified resin is used. The combination of these resins are properly selected and used in accordance with the characteristics of the medium and process conditions. Among these combinations, a combination of a vinyl chloride type copolymer and a polyurethane resin is preferred.

(Inorganic Powder)

The magnetic layer may include a well-known inorganic powder, for example, various aluminas such as α-alumina and β-alumina, dichromium trioxide, α-iron oxide, γ-iron oxide and silicon nitride as well as carbon black.

The thickness (after the calendering) of the magnetic layer is 0.5 to 3.5 μm and preferably 0.7 to 3.0 μm. When the magnetic layer is too thin, the output tends to decrease due to increased surface roughness and reduced saturation magnetic flux density Bm. On the other hand, when the magnetic layer is too thick, the balance of outputs at a recording frequency in high-frequencies and low-frequencies tends to be impaired.

There is no particular limitation to materials used for the non-magnetic support. The material of the non-magnetic support may be selected from various flexible materials and various rigid materials corresponding to the object and made into a given shape and size such as a tape form corresponding to various standards. Examples of the flexible material include various type resins, for example, polyesters such as polyethylene terephthalate and polyethylene naphthalate, polyolefins such as polypropylene, polyamides, polyimides and polycarbonates.

The thickness of the non-magnetic support is preferably 3.0 to 75.0 μm. The shape of the non-magnetic support may be, though not particularly limited to, a tape form, sheet form, card form or disk form and the like. Various materials may be selected and used according to the shape and requirements.

EXAMPLES

Next, the present invention will be explained in more detail using examples together with comparative examples, which are not intended to be limiting of the present invention.

Example 1

A magnetic recording medium provided with a back-coat layer and a magnetic layer which have the following compositions was made. The values of the composition were expressed as parts by weight.

<Preparation of Back-coat Coating Material A>

(Preparation of a Binder Solution)

Vinyl chloride type copolymer (vinyl chloride/vinyl acetate/vinyl alcohol/amine-modified vinyl unit/acidic functional group modified vinyl unit copolymer; monomer ratio by weight=91:3:5:0.5:0.5, degree of average

| | |
|---|---|
| Vinyl chloride type copolymer (vinyl chloride/vinyl acetate/ vinyl alcohol/amine-modified vinyl unit/acidic functional group modified vinyl unit copolymer; monomer ratio by weight = 91:3:5:0.5:0.5, degree of average polymerization = 400) | 35 parts |
| Polyester polyurethane resin (containing —SO$_3$Na group, Mn = 40000, Tg = 20° C.) | 35 parts |
| MEK (methyl ethyl ketone) | 100 parts |
| Toluene | 80 parts |
| Cyclohexanone | 100 parts |

The above compositions were placed in a hyper mixer and mixed with stirring for 6 hours to prepare a binder solution. The binder solution was subjected recycle filtration performed. using a depth filter with a 95% cut filter accuracy of 5.0 μm for 8 hours.

(Kneading/dispersing Treatment)
Carbon black (BLACK PEARLS 800, manufactured by SHOWA CABOT K.K.,

| | |
|---|---|
| Carbon black (BLACK PEARLS 800, manufactured by SHOWA CABOT K.K., average particle size = 17 nm) | 75 parts |
| Carbon black (BLACK PEARLS 130, manufactured by SHOWA CABOT K.K., average particle size = 75 nm) | 5 parts |
| Calcium carbonate (Hakuenka O, manufactured by Shiraishi Kogyo, average particle size = 30 nm) | 20 parts |
| The above binder solution | 130 parts |

The above compositions were placed in a pressure kneader and kneaded for 2 hours. After the kneading, the following compositions were further added and the mixture was adjusted to an optimal viscosity for dispersing treatment.

| | |
|---|---|
| The binder solution | 45 parts |
| MEK | 70 parts |
| Toluene | 55 parts |
| Cyclohexanone | 70 parts |

After the mixing treatment, the resulting mixture was subjected to dispersing treatment by using a sand mill to obtain a slurry.

| | |
|---|---|
| The binder solution | 175 parts |
| MEK | 200 parts |
| Toluene | 250 parts |
| Cyclohexanone | 200 parts |

The above components were placed in a hyper mixer and stirred for 1 hour to prepare a viscosity-adjusting solution. The viscosity-adjusting solution was subjected recycle filtration performed using a depth filter with a 95% cut filter accuracy of 1.2 μm for 8 hours.

The viscosity-adjusting solution obtained after the recycle filtration and the slurry obtained after the dispersing treatment were mixed and the mixture was subjected to dispersing treatment using a sand mill to adjust the viscosity to 10 cp, thereby preparing a back-coat coating material. The above coating material was subjected to recycle filtration performed using a depth filter with a 95% cut filter accuracy of 1.2 μm for 8 hours (method for measuring viscosity: the viscosity was measured at 20° C. and a shear rate of 3000 sec$^{-1}$ by using MR-300 Soliquid Meter, manufactured by Rheology).

(Final Back-coat Coating Material)

To 100 parts by weight of the coating material after the filtration was added 1 part by weight of an isocyanate compound (Coronate-L, manufactured by Nippon Polyurethane and the mixture was mixed with stirring to prepare a back-coat coating material A.

<Preparation of a Coating Material for Magnetic Layer>
(Preparation of a Binder Solution)

| | |
|---|---|
| Vinyl chloride type resin (MR-110, manufactured by Nippon Zeon) | 10 parts |
| Polyester polyurethane resin (UR-8300, manufactured by Toyobo) | 7 parts |
| MEK | 21 parts |
| Toluene | 21 parts |
| Cyclohexanone | 21 parts |

The above compositions were placed in a hyper mixer and mixed with stirring for 6 hours to prepare a binder solution. The binder solution was subjected recycle filtration performed using a depth filter with a 95% cut filter accuracy of 5.0 μm for 8 hours.

(Kneading/Dispersing Treatment)

| | |
|---|---|
| Magnetic powder of ferromagnetic metal (Hc = 158 kA/m, σs = 140 Am$^2$/kg, specific surface area = 60 m$^2$/g, average major axis length = 0.08 μm, Fe/Co/Al/Y = 100/20/4.2/5.3) | 100 parts |
| α-Al$_2$O$_3$ (HIT-60A, manufactured by Sumitomo Chemical) | 8 parts |
| The above binder solution | 40 parts |

The above compositions were placed in a pressure kneader and kneaded for 2 hours. After the kneading, the following compositions were added and the mixture was adjusted to an optimal viscosity for dispersing treatment.

| | |
|---|---|
| The binder solution | 40 parts |
| MEK | 15 parts |
| Toluene | 15 parts |
| Cyclohexanone | 15 parts |

After the mixing treatment, the resulting mixture was subjected to dispersing treatment by using a sand mill to obtain a slurry.

| | |
|---|---|
| Stearic acid | 0.5 part |
| Myristic acid | 0.5 part |
| Butyl stearate | 0.5 part |
| MEK | 65 parts |
| Toluene | 65 parts |
| Cyclohexanone | 65 parts |

The above compositions were placed in a hyper mixer and mixed with stirring for 1 hour to prepare a viscosity-adjusting solution. The viscosity-adjusting solution was subjected to recycle filtration performed using a depth filter with a 95% cut filter accuracy of 1.2 μm for 8 hours.

The viscosity-adjusting solution obtained after the recycle filtration and the slurry obtained after the dispersing treatment were mixed and the mixture was subjected to dispersing treatment using a sand mill to adjust the viscosity to 50 cp, thereby preparing a magnetic layer coating material. The above coating material was subjected to recycle filtration performed using a depth filter having a 95% cut filter accuracy of 1.2 μm for 8 hours (method for measuring viscosity: the viscosity was measured at 20° C. and a shear rate of 3000 sec$^{-1}$ by using MR-300 Soliquid Meter, manufactured by Rheology).

(Final Coating Material for Magnetic Layer)

To 100 parts by weight of the coating material after the filtration was added 0.8 part by weight of an isocyanate compound (Coronate-L, manufactured by Nippon Polyurethane) and the mixture was mixed with stirring to prepare a coating material for magnetic layer.

<Preparation of Magnetic Recording Medium>

The above magnetic coating material was applied onto a PET (polyethylene terephthalate) support having a thickness of 8.0 μm by using an extrusion-nozzle coating method in a dry thickness of 1.5 μm, followed by orientation treatment (0.7T), drying (100° C.) and calendering (2550 N/cm, triple nip).

The above back-coat coating material A was applied onto the surface opposite to the magnetic layer in a dry thickness of 0.5 μm, followed by drying and calendering in the same condition as above and was rolled. This roll was subjected to thermosetting treatment performed at 60° C. for 24 hours and slit down to a width of 8 mm to make a sample of a magnetic recording medium of a tape form.

Example 2

A back-coat coating material B was prepared in the same manner as in Example 1 except that calcium carbonate (Homocal D, manufactured by Shiraishi Kogyo) having an average particle size of 70 nm was used in place of calcium carbonate having an average particle size of 30 nm which was used in the preparation of the back-coat coating material A of Example 1. A sample of a magnetic recording medium of a tape form was made using the back-coat coating material B in the same manner as in Example 1.

Example 3

A back-coat coating material C was prepared in the same manner as in Example 1 except that barium sulfate (BF-20, manufactured by Sakai Kagaku Kogyo) having an average particle size of 30 nm was used in place of calcium carbonate having an average particle size of 30 nm which was used in the preparation of the back-coat coating material A of Example 1. A sample of a magnetic recording medium of a tape form was made using the back-coat coating material C in the same manner as in Example 1.

Example 4

A back-coat coating material D was prepared in the same manner as in Example 1 except that carbon black having an average particle size of 20 nm was used in place of the above carbon black having an average particle size of 17 nm which was used in the preparation of the back-coat coating material A of Example 1. A sample of a magnetic recording medium of a tape form was made using the back-coat coating material D in the same manner as in Example 1.

Examples 5 to 8

Back-coat coating materials E, F, G and H were prepared in the same manner as in Example 1 except that each proportion by weight of the above carbon black having an average particle size of 17 nm and the above carbon black having an average particle size of 75 nm was altered to those shown in Table 1. Each sample of a magnetic recording medium of a tape form was made using these back-coat coating materials E, F, G and H in the same manner as in Example 1.

Comparative Example 1

A back-coat coating material I was prepared in the same manner as in Example 1 except that 99 parts of carbon black having an average particle size of 17 nm and 1 part of carbon black (Sevacarb MT-Cl, manufactured by Columbian Chemicals Company) having an average particle size of 350 nm were used in place of 75 parts of the above carbon black having an average particle size of 17 nm and 5 parts of the above carbon black having an average particle size of 75 nm which were used in the preparation of the back-coat coating material A of Example 1 and calcium carbonate was not used. A sample of a magnetic recording medium of a tape form was made using the back-coat coating material I in the same manner as in Example 1.

Comparative Example 2

A back-coat coating material J was prepared in the same manner as in Example 1 except that carbon black (BP1300, manufactured by SHOWA CABOT K.K.) having an average particle size of 13 nm was used in place of the above carbon black having an average particle size of 17 nm which was used in the preparation of the back-coat coating material A of Example 1. A sample of a magnetic recording medium of a tape form was made using the back-coat coating material J in the same manner as in Example 1.

Comparative Example 3

A back-coat coating material K was prepared in the same manner as in Example 1 except that carbon black (BP430, manufactured by SHOWA CABOT K.K.) having an average particle size of 27 nm was used in place of the above carbon black having an average particle size of 17 nm which was used in the preparation of the back-coat coating material A of Example 1. A sample of a magnetic recording medium of a tape form was made using the back-coat coating material K in the same manner as in Example 1.

Comparative Example 4

A back-coat coating material L was prepared in the same manner as in Example 1 except that carbon black (Carbon Black #3050, manufactured by Mitsubishi Chemical) having an average particle size of 55 nm was used in place of the above carbon black having an average particle size of 75 nm which was used in the preparation of the back-coat coating material A of Example 1. A sample of a magnetic recording medium of a tape form was made using the back-coat coating material L in the same manner as in Example 1.

Comparative Example 5

A back-coat coating material M was prepared in the same manner as in Example 1 except that carbon black (Carbon Black #5, manufactured by Mitsubishi Chemical) having an average particle size of 85 nm was used in place of the above carbon black having an average particle size of 75 nm which was used in the preparation of the back-coat coating material A of Example 1. A sample of a magnetic recording medium of a tape form was made using the back-coat coating material M in the same manner as in Example 1.

Comparative Example 6

A back-coat coating material N was prepared in the same manner as in Example 1 except that barium sulfate having an average particle size of 20 nm was used in place of the above calcium carbonate having an average particle size of 30 nm which was used in the preparation of the back-coat coating material A of Example 1. A sample of a magnetic recording medium of a tape form was made using the back-coat coating material N in the same manner as in Example 1.

Comparative Example 7

A back-coat coating material O was prepared in the same manner as in Example 1 except that calcium carbonate (Hakuenka CCR, manufactured by Shiraishi Kogyo) having an average particle size of 80 nm was used in place of the above calcium carbonate having an average particle size of 30 nm which was used in the preparation of the back-coat coating material A of Example 1. A sample of a magnetic recording medium of a tape form was made using the back-coat coating material 0 in the same manner as in Example 1.

(Evaluation of Samples)

1. Dropout

With regard to each sample, a dropout (DO) was measured. In this measurement, the case where a reduction of an output of 12 dB or more continued for 2 μsec or more was determined as the dropout. The measurement was made for 10 minutes by using a sample just after preparation and a sample after storage in a high temperature and humidity condition, namely, after it was stored in an environmental condition of 50° C. and 80%RH for 5 days and further allowed to stand in an environmental condition of 20° C. and 60%RH for 24 hours, and the measured dropouts were averaged to show dropouts per one minute. For the measurement, an EV-S900(Hi8 Format VTR) manufactured by Sony was used.

2. Durable Friction of a Back-coat

Each sample was measured for the durable friction of the back-coat by using a horizontal type high speed tensile tester (Model No. HTB-S) manufactured by Island Industries. The measuring condition was as follows.

Holding angle: 90 degrees, load: 50 g, measuring speed: 1800 mm/min, 500 passes of measurement were made for a distance of 50 mm.

Moreover, the friction coefficient of the surface of the back-coat layer after 500 passes was measured.

The surface of the back-coat layer after being measured was confirmed by visual observation and evaluated as follows.

○: the case where no flaw was found and the friction coefficient after 500 passes was 0.25 or less.

X: the case where flaws were found or the friction coefficient after 500 passes exceeded 0.25.

The results are shown in Table 1.

As shown in Table 1, each tape sample of Examples 1–8 is reduced in dropout both just after preparation and after storage in a high temperature and high humidity condition and is superior in the durable friction of the back-coat, showing that it has practically sufficient performance. Particularly the performance of each tape sample of Examples 1, 2, 3, 5, 6 and 7 is excellent.

On the other hand, in each tape sample of Comparative Examples 1, 2, 3, 5 and 7, considerably many dropouts appear after storage in a high temperature and high humidity condition. Each tape sample of Comparative Examples 4 and 6 is inferior in the durable friction of the back-coat although the generation of a dropout is reduced.

As this invention may be embodied in several forms without departing from the spirit or essential characteristics thereof, the foregoing examples are therefore only illustrative and should not be interpreted as restrictive, and all changes that fall within equivalence of claims are therefore intended to be embraced by the claims.

TABLE 1

| | Average Particle Size(nm) | Oil Absorption (cc/100 g) | BET (m²/g) | Examples | | | | | | | | Comparative Examples | | | | | | |
|---|---|---|---|---|---|---|---|---|---|---|---|---|---|---|---|---|---|---|
| | | | | 1 | 2 | 3 | 4 | 5 | 6 | 7 | 8 | 1 | 2 | 3 | 4 | 5 | 6 | 7 |
| Carbon black | 13 | 91 | 560 | — | — | — | — | — | — | — | — | — | 75 | — | — | — | — | — |
| | 17 | 68 | 210 | 75 | 75 | 75 | — | 77 | 72 | 67 | 65 | 99 | — | — | 75 | 75 | 75 | 75 |
| | 20 | 115 | 200 | — | — | — | 75 | — | — | — | — | — | — | — | — | — | — | — |
| | 27 | 73 | 80 | — | — | — | — | — | — | — | — | — | — | 75 | — | — | — | — |
| Carbon black | 55 | 130 | 29 | — | — | — | — | — | — | — | — | — | — | — | 5 | — | — | — |
| | 75 | 69 | 25 | 5 | 5 | 5 | 5 | 3 | 8 | 13 | 15 | — | 5 | 5 | — | — | 5 | 5 |
| | 85 | 71 | 25 | — | — | — | — | — | — | — | — | — | — | — | — | 5 | — | — |
| | 350 | 41 | 8 | — | — | — | — | — | — | — | — | 1 | — | — | — | — | — | — |
| Calcium carbonate | 30 | — | — | 20 | — | — | — | — | — | — | — | — | 20 | 20 | 20 | 20 | — | — |
| Calcium carbonate | 70 | — | — | — | 20 | — | 20 | 20 | 20 | 20 | 20 | — | — | — | — | — | — | — |
| Barium sulfate | 30 | — | — | — | — | 20 | — | — | — | — | — | — | — | — | — | — | — | — |
| Barium sulfate | 20 | — | — | — | — | — | — | — | — | — | — | — | — | — | — | — | 20 | — |
| Calcium carbonate | 80 | — | — | — | — | — | — | — | — | — | — | — | — | — | — | — | — | 20 |
| DO just after preparation | | | | 500 | 530 | 480 | 680 | 505 | 520 | 560 | 585 | 700 | 650 | 700 | 530 | 680 | 480 | 640 |
| DO after storage in a high temperature and high humidity condition | | | | 520 | 540 | 520 | 860 | 513 | 550 | 630 | 690 | 1500 | 1090 | 1550 | 671 | 1580 | 522 | 1380 |
| Durable friction of the back-coat layer | | | | ○ | ○ | ○ | ○ | ○ | ○ | ○ | ○ | X | ○ | ○ | X | ○ | X | X |

Note:
The proportion is expressed as parts by weight.

What is claimed is:

1. A magnetic recording medium comprising a magnetic layer on one surface of a non-magnetic support and a back-coat layer, containing mainly a non-magnetic powder and a binder, on the other surface, wherein the back-coat layer includes, as the non-magnetic powder:

(a) a first carbon black having an average particle size of approximately 15 to approximately 25 nm, an oil absorption ranging from approximately 50 to approximately 110 cc/100 g and a specific surface area ranging from approximately 100 to approximately 300 m²/g measured by the BET method;

(b) a second carbon black having an average particle size of approximately 60 to approximately 80 nm, an oil absorption ranging from approximately 20 to approximately 80 cc/100 g and a specific surface area ranging from approximately 10 to approximately 50 m²/g measured by the BET method; and (c) at least one of $CaCO_3$ and $BaSO_4$, said at least one of $CaCO_3$ and $BaSO_4$ having an average particle size of 30 to 75 nm; and wherein the back-coat layer includes said first carbon black, said second carbon black and said at least one of $CaCO_3$ and $BaSO_4$ in a ratio of said first carbon black/said second carbon black/said at least one of $CaCO_3$ and $BaSO_4$=60–80/3–15/15–30 by weight.

* * * * *